United States Patent Office.

EDWARD LIVINGSTON PERRY, OF NEW YORK, N. Y., ASSIGNOR TO COMBINATION RUBBER COMPANY, OF SAME PLACE.

Letters Patent No. 96,832, dated November 16, 1869.

IMPROVED RUBBER-HOSE.

The Schedule referred to in these Letters Patent and making part of the same.

*To whom it may concern:*

Be it known that I, EDWARD LIVINGSTON PERRY, of the city, county, and State of New York, have invented certain new and useful Improvements in Vulcanized India-Rubber Hose; and I hereby declare the following to be a full, clear, and exact description of the same.

In the manufacture of vulcanized India-rubber hose, it has been usual to use coarse heavy canvas, loosely woven, whereby, when the canvas is passing through the friction-machine, the ground and prepared rubber may be forced in between the threads of the warp and woof, forming, in effect, a sheet of rubber, through which run the yarns of which the canvas is made; and when great strength is required, as in the case of hose for steam fire-engines, it has hitherto been the universal custom to attain this end by increasing very much the thickness of the canvas, which, as it is coarse, makes the hose of unwielding bulk, and increases greatly its weight without a proportionate gain in power to resist pressure.

After repeated and long-continued experiments, I have found that a lighter, stronger, more flexible, and more durable hose can be made by substituting for the ordinary heavy coarse canvas, fine canvas, made of hard twisted thread or yarn woven closely together, such as that known in the market under the name of "Rocky Mountain" and "Western Star Duck."

The employment of this material for the numerous plies of which the hose is formed tend to greatly decrease the bulk, while the rubber, instead of penetrating between the threads, does not enter the canvas to such an extent, but lies principally on the surfaces, and as a greater number of plies or layers of the canvas can be contained in the same space as that formerly occupied by the heavy canvas, the hose is made more durable and has much greater capacity to resist pressure.

In fact, experiment has demonstrated that hose made in accordance with my invention, while weighing twenty per cent. less than ordinary hose, will have about twenty per cent. increased capacity for resistance.

The manufacture of the hose in nowise differs from the ordinary modes in use, the novelty consisting, as before stated, in the employment of the fine closely-woven canvas, a suitable number of plies of which are put together and combined with the rubber, and vulcanized in the usual way.

Having now described my invention, and the manner in which the same is or may be carried into effect,

What I claim, and desire to secure by Letters Patent, is—

As a new manufacture, vulcanized India-rubber hose for steam fire-engines, and other purposes, in which the rubber is combined with a suitable number of plies of fine canvas, such as described, made of hard twisted and closely-woven threads or yarns, substantially as and for the purposes set forth.

In testimony whereof, I have signed my name to this specification, before two subscribing witnesses.

EDWARD LIVINGSTON PERRY.

Witnesses:
A. POLLOK,
M. BAILEY.